May 3, 1932.  H. FORD  1,856,183
BRAKE
Filed June 13, 1927

INVENTOR.
Henry Ford.
BY
ATTORNEY

Patented May 3, 1932

1,856,183

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed June 13, 1927. Serial No. 198,515.

The object of my invention is to provide a brake of simple, durable, and inexpensive construction.

A further object of my invention is to provide a brake having an automatic device whereby as the brake shoes wear down, then the brake will still be returned to a predetermined position relative to the brake drum when in inoperative position.

Still another object of my invention is to provide a brake having a pair of brake shoes having a manual adjustment at one end thereof, an actuating device at the other end thereof and an automatic stop device intermediate of their ends where they are pivotally connected together so that the pivot between the brakes will always return to such a position when the brakes are inoperative that the working surfaces of the shoes will be a predetermined distance from the brake drum.

Still a further object of my invention is to provide a support for the pivotal connection of the two brake shoes which will permit this pivot to float, and to automatically assume a position, when the brakes are inoperative with the working surfaces of the shoes a predetermined distance from the drum.

Still a further object of my invention is to provide a brake having a pair of shoes pivoted together and floated intermediate of their ends wherein this pivot is mounted on a link which in turn is mounted on the brake anchor plate and to connect the pivot to the link with an automatic adjusting connection, whereby the distance between the support of the link on the brake anchor plate and the connection of the pivot to the link will be automatically adjusted as the brake shoes wear down.

With these and other objects in view my invention consists in the arrangement, construction and combination of the various parts of my improved device as described in the specifications, claimed in the claims, and illustrated in the drawings in which:

Figures 1, 2, 3:
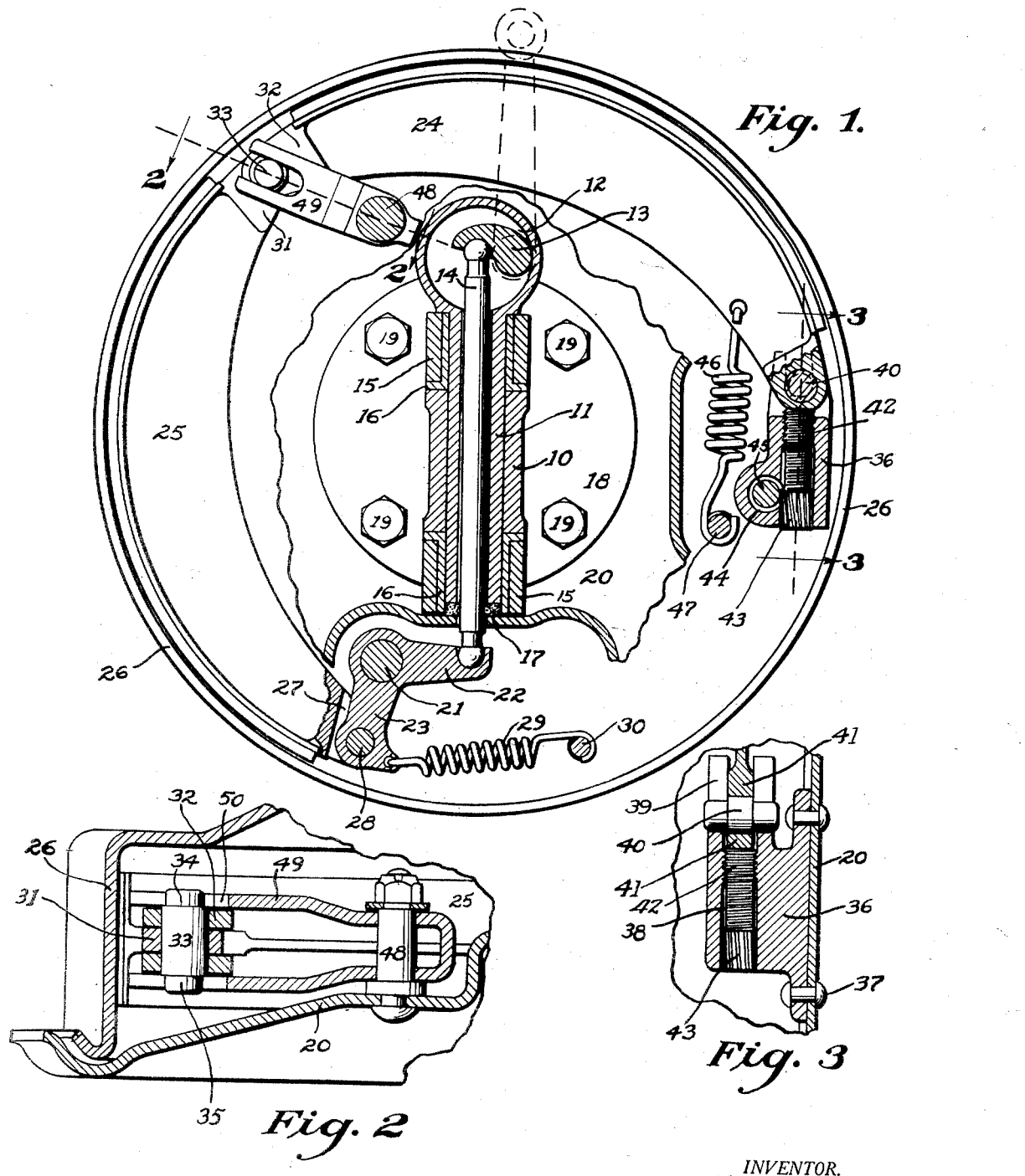
Figure 1 shows an elevation of a brake construction embodying my improved invention, the brake anchor plate, and the brake drum being partly broken away to better illustrate the construction.
Figure 2 shows a transverse sectional view taken on the line 2—2 of Figure 1.
Figure 3 shows a vertical sectional view taken on the line 3—3 of Figure 1.

Referring to the accompanying drawings, I have used the reference numeral 10 to indicate generally the eye at the end of an axle through which a hollow king bolt 11 extends, and which has a housing 12 formed at the upper end thereof. A cam member 13 is rotatably mounted in the housing 12 and connected by a ball and socket joint with a brake actuating push rod 14 which extends through the hollow king bolt. The ends of the clevis 15 on a spindle (not shown) are provided with bearing sleeves 16 which are journalled on the king bolt 11. A grease retainer 17 is provided at the bottom of the king bolt 11 to prevent the lubrication provided for the cam and push rod from interfering with the brake action. The spindle is provided with an annular flange 18 which is connected by a plurality of bolts 19 with a brake anchor plate 20. A stud 21 is fixed in the brake anchor plate 20 and forms the pivotal support for a bell crank lever having arms 22 and 23.

A pair of brake shoes 24 and 25 are mounted in the housing formed between the brake anchor plate 20 and the brake drum 26. Each of these shoes is provided at one end with a single ear and at the other end with a pair of spaced ears, the spaced ears having aligned openings therein. The pair of ears 27 at the lower end of the shoe 25 are pivotally connected by the pivot 28 with the end of the arm 23 of the bell crank lever. The second arm 22 of the bell crank lever is connected with a ball and socket connection with the lower end of the push rod 14 whereby swinging of the cam 13 may reciprocate the push rod 14 thereby swinging the bell crank lever to actuate the brake. The brake, including the bell crank, push rod, cam, and other parts is returned to inoperative position by the spring 29 which is hooked at one end to the bell crank lever and at the other end to a stud 30 mounted on the brake anchor plate. The brake shoes 24 and 25 are pivotally connected together at their adjacent ends by telescoping the single ear 31 of the shoe 25 in the double ears 32 of the shoe 24 and then passing a pivot pin 33 through the aligned openings therein. This pivot pin has a relatively large diameter where it passes through these ears and has shoulders formed at the end of this central large portion at 34 and then terminates in the contracted portions 35.

A bracket 36 is riveted as at 37 to the brake anchor plate 20 and is provided with a longitudinal bore 38 therethrough, which is threaded adjacent to its upper end. Above this bore the bracket is formed with a pair of spaced slotted ears 39 which receive a pivot pin 40 which extends through the single ear 41 at the second end of the brake shoe 24. This pin 40 forms a pivot support for the end of the brake shoe 24, but at the same time longitudinal movement of this shoe is permitted by the sliding of the pin 40 in the slots in the ears 39. This pin 40 has an enlarged central portion fitted to the opening in the ear 41 and the contracted end portions extend through the slots in the ears 39 so that shoulders are formed to lock the pin from longitudinal movement until the pin has been pulled out of said slots. An adjusting screw member 42 is provided with threads at one end adapted to coact with the threads in the bore 38 and with the worm teeth at 43 at the other end. The bracket 36 is provided with a second bore 44 which is perpendicular to the bore 38 and which connects therewith adjacent to the worm teeth 43 on the adjusting screw member. A worm device 45 is journalled in this bore 44 with a worm thereon in position to coact with the worm teeth 43 to thereby rotate the adjusting member 42. A spring 46 has one end hooked through the brake shoe 24 adjacent to the bracket 36 and the other end hooked over a stud 47 which is extended from the brake anchor plate 20, this spring being so placed as to constantly urge the ear 41 of the brake shoe 24 against the end of the adjusting member 42.

It will thus be seen that if the worm 45 is rotated then the adjusting member number 42 will be similarly rotated to thereby push the ear 41 away from the bracket 36. In other words the adjusting device 42 is moved to push the ear 41 away from the bracket 36 and spring 46 and will return it toward the bracket when permitted to do so by movement of the adjusting member 42. By referring to the drawings and especially Figure 1 it will be seen that movement of the ear 41 away from the bracket 36 will tend to move the brake shoes 24 and 25 outwardly toward the drum to thereby compensate for wear. If new linings are installed then the adjusting device 42 can be rotated to allow the ear 41 to approach the bracket 36 and thereby permit the brake shoes to separate the proper distance from the drum 26. A stud 48 is fixed in the brake anchor plate 20 in position spaced from the normal position of the pin 33. A strip of sheet metal is bent upon itself to form a U-shaped supporting link for the pin 33 as is illustrated in Figure 2. This strip is provided adjacent to its closed end with registering openings designed to receive the stud 48 whereby the link may be pivotally supported on the brake anchor plate.

The other ends of this link to which I have given the general reference numeral 49 are slotted as at 50 to receive the contracted ends 35 of the pin 33. These slots 50 are so constructed that they will tightly embrace the contracted ends 35 and the surfaces of the links 49 adjacent to these slots will tightly engage the shoulders 34 due to the resilience of the material of the link 50. This engagement of the link 50 with the pin 33 is designed to be such that positive actuation of the brake through the brake operating mechanism will be sufficient to slide the pin 33 along slots 50 but that the strength of the means for returning the brake to inoperative position will not be great enough to move the pin 33 in the slots 50.

It will be noted that the stud 48 is so placed on the brake anchor plate 20 that it lays in a line between the pin 33 and the pin 40, so that when the ear 24 is swung on its pivot 40 then the tendency for longitudinal movement of the pin 33 in the slots 50 due to the swinging of the link 49 on the pivot 48 will be almost, if not entirely, negligible.

From the foregoing description of the practical application of my improved device it will be seen that the brake shoes may be moved to contact with the brake drum by pressing downwardly on the push rod 14. In this connection it should be noted that the push rod 14 is received loosely in the opening of the king bolt so that its operation will not be hampered by its frictional engagement with said king bolt. When the shoes are so moved to operative position, then the ends which are pivoted together on the pin 33 will swing on the link 49 into engagement with a brake drum. If the position of the pin 33 in the slots 50 is not correct at the start of the brake actuating movement, then the pressure of the brake actuating device will cause the pin 33 to slide along slots 50 to position to where the brake shoes will properly engage their entire length with the brake drum. When the spring 29 returns the parts to their inoperative position then the pin 33 will tend to remain in the same place in the slots 50 to which it has been moved, and will stay in that place until such time as wear or change in the brake linings will again cause it to change its position. This means that the ends of the brake shoes which are pivoted together will always be returned automatically to position whereby the working faces of the brake shoes will be a predetermined distance from the working surfaces of the brake drum. This insures that when the brake pedal is in inoperative position a constant clearance will be maintained between the brake shoes and the drum regardless of the adjustment of the brake or the condition of the brake shoe linings. This feature is important because an incorrect adjustment made by an unskilled owner or mechanic will be corrected upon the first application of the brakes so as to give uniform brake clearance and thereby prevent dragging of the brake shoes. The adjustment of the brakes is further facilitated because only one manual adjustment is needed. In this connection it should be pointed out that an advantage arises from my improved device in that the worm 45 may be extended from the brake anchor plate to adjust the end member 42 and that the parts may be readily made dust and grease proof while at the same time the operation of the brake has substantially no effect tending to cause the adjustment to wear or get out of order.

Some changes may be made in the arrangement, combination, and construction of the various parts of my improved device without departing from the spirit of my invention, and it is my intention to cover by my claims such changes as may be reasonably included within the scope thereof.

I claim as my invention;

1. In a brake, a brake anchor plate, a pair of brake shoes, means for pivotally and adjustably mounting one end of one of said shoes on the brake anchor plate, means for mounting one end of the second shoe on the brake anchor plate to swing same to render the brake shoes operative, means for pivotally connecting together the second ends of said brake shoes, and means for adjustably supporting the pivotal connection of said brake shoes, whereby they will automatically travel a predetermined distance from operative to inoperative position.

2. In a brake, a hollow king bolt, a spindle mounted thereon, a brake anchor plate mounted on said spindle, a push rod extended through said king bolt, a bell crank lever pivoted on said brake anchor plate, a pair of brake shoes mounted on said brake anchor plate with their adjacent ends pivotally connected together, means for pivotally and adjustably mounting one of the free ends of said brake shoes on the brake anchor plate, means for pivotally connecting the push rod and the other free end of the brake shoes to the arms of the bell crank lever, means for supporting the connected ends of the brake shoes whereby actuation thereof may always automatically move said connection a predetermined distance from operative to inoperative positions, and means for actuating said push rod.

3. In a brake, a brake anchor plate, a pair of brake shoes, a pivot pin connecting the adjacent ends of said shoes, means for pivotally connecting the free end of one shoe to the brake anchor plate, means for operating the free end of the other shoe to apply the brake, and a link freely pivoted to the brake anchor plate frictionally engaging the first mentioned pivot pin to form a self adjusting brake shoe retraction stop.

4. In a swiveled wheel brake, a knuckle joint having a hollow king bolt, means disposed at each end of said bolt to operatively apply the brakes, and a push rod extending through said hollow bolt supported wholly by said brake operating means.

5. In a swiveled wheel brake, a knuckle joint having a king bolt, an axial bore in said bolt, brake applying means disposed adjacent to the lower end of said bolt, brake operating means disposed adjacent to the upper end of said bolt, and a push rod extending through said bore supported wholly by the brake operating means and brake applying means.

6. In a swiveled wheel brake, a knuckle joint having a hollow king bolt, means disposed at each end of said bolt to operatively apply the brakes, a ball socket sunk in each of the brake applying means, and a push rod having ball ends engaging said sockets and supported wholly thereby.

7. In a swiveled wheel brake, a knuckle joint having a king bolt, a brake anchor plate having its inner face secured to said knuckle joint, brake shoes mounted on the outer face of said anchor plate, an axial bore in the king bolt, an opening in the anchor plate aligned with said bore, a brake shoe operating means mounted on the anchor plate, a brake applying means mounted on the upper end of the king bolt, and a push rod extending through the axial bore in the king bolt and through the opening in the brake anchor plate wholly supported by the brake shoe operating means and brake applying means.

HENRY FORD.